(12) United States Patent
Davis

(10) Patent No.: US 10,278,362 B2
(45) Date of Patent: May 7, 2019

(54) AUTOMATIC TREAT DISPENSER

(71) Applicant: Andrew Peter Davis, Bellevue, WA (US)

(72) Inventor: Andrew Peter Davis, Bellevue, WA (US)

(*) Notice: Subject to any disclaimer, the term of this patent is extended or adjusted under 35 U.S.C. 154(b) by 0 days.

(21) Appl. No.: 15/823,402

(22) Filed: Nov. 27, 2017

(65) Prior Publication Data

US 2018/0146640 A1    May 31, 2018

Related U.S. Application Data

(60) Provisional application No. 62/497,612, filed on Nov. 26, 2016.

(51) Int. Cl.
*G07F 11/52* (2006.01)
*A01K 5/01* (2006.01)
*A01K 15/02* (2006.01)
*A01K 29/00* (2006.01)
*G07F 11/00* (2006.01)

(52) U.S. Cl.
CPC .......... *A01K 5/0114* (2013.01); *A01K 15/02* (2013.01); *A01K 29/00* (2013.01); *G07F 11/007* (2013.01); *G07F 11/52* (2013.01)

(58) Field of Classification Search
None
See application file for complete search history.

(56) References Cited

U.S. PATENT DOCUMENTS

| | | | |
|---|---|---|---|
| 3,156,214 A | 11/1964 | Denney et al. | |
| 4,907,538 A | 3/1990 | Helmle et al. | |
| 5,003,925 A * | 4/1991 | Roberts | A01K 61/85 119/51.01 |
| 5,957,082 A * | 9/1999 | Budman | A01K 5/0114 119/54 |
| 6,732,884 B2 * | 5/2004 | Topliffe | A61J 7/0481 221/10 |
| 9,226,477 B2 | 1/2016 | Davis | |
| 9,723,813 B2 | 8/2017 | Davis | |
| 9,723,814 B2 | 8/2017 | Davis | |

(Continued)

FOREIGN PATENT DOCUMENTS

KR    20110134190    12/2011

OTHER PUBLICATIONS

International Search Report and Written Opinion of the International Searching Authority dated Feb. 28, 2018, in International Patent Application No. PCT/US17/63327, 9 pages.

*Primary Examiner* — Gene O Crawford
*Assistant Examiner* — Ayodeji T Ojofeitimi
(74) *Attorney, Agent, or Firm* — Lowe Graham Jones PLLC

(57) ABSTRACT

A rotatable container includes a projection that protrudes into the container and is aligned with an opening at a first end of the container. The projection defines a concave surface with a ramp that guides treats through the opening when oriented vertically. The container may be cylindrical and sit on a base defining a cylindrical seat. A second end of the container engages a rotator on the base that is driven by a motor. A front wall of the container may define an opening that aligns with the opening of the container when the ramp is oriented vertically. A sensor may sense a position of the projection and invoke pausing of rotation by the motor.

20 Claims, 7 Drawing Sheets

(56) References Cited

U.S. PATENT DOCUMENTS

2009/0314223 A1 12/2009 Yuu et al.
2014/0060441 A1* 3/2014 Baxter ................. A01K 5/0291
119/61.5

* cited by examiner

AUTOMATIC TREAT DISPENSER

PRIORITY CLAIM

This application claims priority from U.S. Provisional Patent Application No. 62/497,612, filed Nov. 26, 2016, and entitled "Automatic Jam-Proof Universal Treat Dispenser."

FIELD OF THE INVENTION

This application relates to automatic treat dispensers for animals.

BACKGROUND OF THE INVENTION

Anyone with a dog knows that there are certain treats that they adore and other treats that they do not get excited about. Ideally, a treat dispenser should be able to reliably dispense a wide variety of treats to accommodate the pet's favorite. This is especially a challenge in design, since the treats can have a large variety of sizes, shapes, weights, and consistencies. All of these factors make an automatic treat dispenser prone to jamming, failing, or dispensing too many or too few treats.

The apparatus disclosed herein provides an improved approach for dispensing treats.

SUMMARY OF THE INVENTION

An apparatus includes a rotational actuator defining an axis of rotation and a container. A wall extends perpendicular to the axis and defines a wall aperture, the wall extending across a first end of the container. A projection protrudes into the container and rotatable by the rotational actuator, the projection configured to rotate between a first position to a second position with rotation by the rotational actuator, the projection configured to pick up one or more items from the container when moving from the first position to the second position and drop the one or more items through the wall aperture when in the second position.

In some embodiments, the projection defines a concave structure facing in a circumferential direction about the axis of rotation. The concave structure may include a ramp surface that slopes outwardly from the axis of rotation with distance from the wall.

In some embodiments, the wall is secured to the container and the projection is mounted to the wall. In some embodiments, the wall is removably securable to the container and the projection is fastened to the wall.

In some embodiments, the apparatus includes a seat sized to rotatably receive the container, the rotational actuator being mounted to the seat. In some embodiments, the seat includes a seat face defining a seat aperture, the seat aperture positioned such that the wall aperture overlaps the seat aperture when the projection is in the second position, the projection being mounted to the wall. The container may be cylindrical. In some embodiments, the container includes a container bottom positioned opposite the wall, the rotational actuator engaging the container bottom. The container bottom may define a groove and a rib that is secured to the rotational actuator, the rib being positioned within the groove when the container is positioned within the seat.

In some embodiments, a sensor is configured to sense a state of rotation of the projection. A controller is coupled to the sensor and the rotational actuator. The controller is programmed to repeatedly (a) invoke rotation of the container until the sensor indicates that the projection has at least reached the second position; and (b) pause rotation of the container for a delay period after performing (a)

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
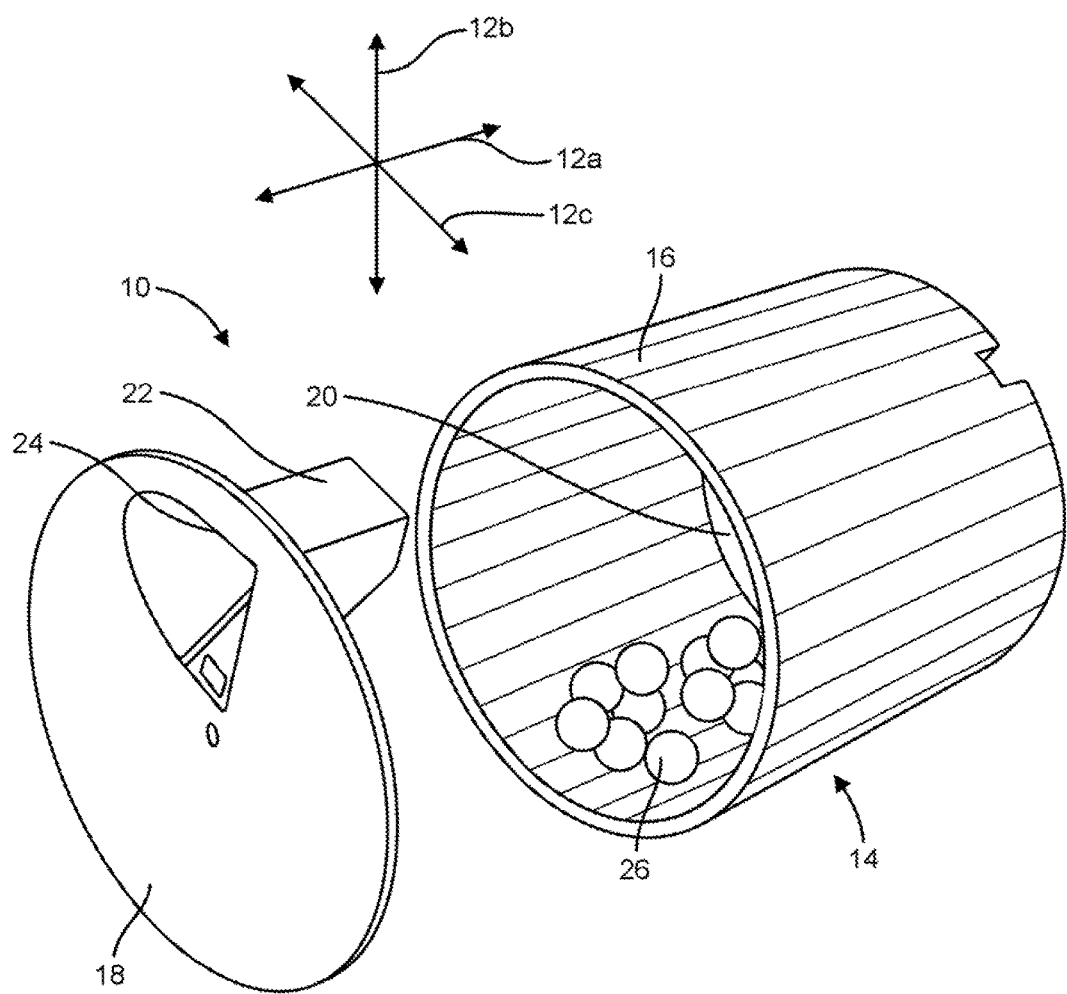
FIG. 1 is an isometric view of a container for a treat dispenser in accordance with an embodiment of the present invention.

Referring to FIG. 1, an apparatus 10 may be understood with respect to a longitudinal direction 12a, vertical direction 12b, and lateral direction 12c that are all mutually perpendicular to one another.

The apparatus 10 may include a container 14 including a sidewall 16, which may have a cylindrical shape about an axis of symmetry parallel the longitudinal direction 12a. The container may include a front wall 18 and back wall 20 that define a container volume along with the interior of the sidewall 16. In the illustrated embodiment, the back wall 20 is fastened to one end of the sidewall 16 and the front wall 18 is a removable lid that is securable to the sidewall 16, such as by means of a press fit or threaded engagement. In other embodiments this relationship is reversed and the back wall 20 functions as a removable lid. In still other embodiments, neither wall 18, 20 is removable and a separate opening and lid are provided in the sidewall 16 for loading the container 14.

The front wall 18 defines a projection 22 that protrudes inwardly into the container 14 when the front wall 18 is secured to the sidewall 16. The projection 22 is aligned with an opening 24 in the front wall 18. As described in greater detail below, in response to rotation of the projection 22, treats 26 are lifted by the projection 22 and released through the opening 24.

Figure 2:
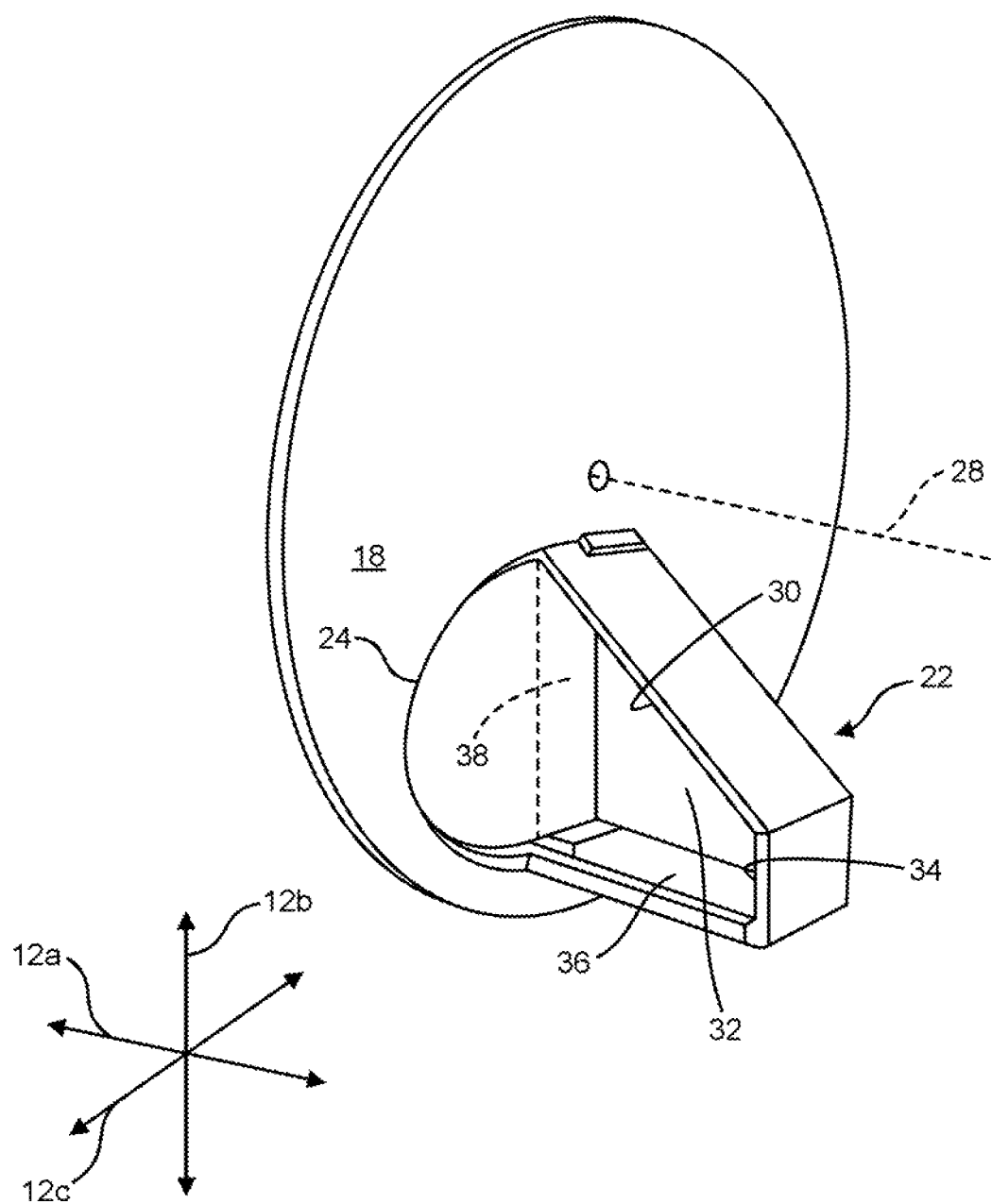
FIG. 2 is an isometric view of a lid with an integrated dispensing basket in accordance with an embodiment of the present invention.

Referring to FIG. 2, the projection 22 may be shaped as a basket or cup that defines a concave interior volume for containing treats. The concave interior volume may have an opening that faces circumferentially about an axis of rotation 28 of the projection, the axis 28 being parallel to the longitudinal direction 12a.

In the illustrated embodiment, the projection 22 includes a ramp surface 30 that that slopes radially outwardly from the axis of rotation 28 with distance from the front wall 18.

As is apparent in FIG. 2, the projection 22, including the ramp surface 30, is positioned completely to one side of the axis of rotation 28. In other embodiments, the projection 22 may be intersected by the axis of rotation 28.

As is apparent in FIG. 2, the projection 22 may include a bottom surface 32 having a far wall 34 and sidewall 36 projecting outwardly therefrom in the same direction of the ramp. The ramp surface 30 includes one edge connected to the front wall 18, an edge connected the bottom surface 32, and an edge connected to an edge of the far wall 34. The far wall 34 includes an edge connected to the bottom surface 32 and an edge connected to an edge of the side wall 36. The sidewall includes an edge connected to the bottom surface 32 and an edge connected to the front wall 18. Together the ramp surface 30, bottom surface 32, far wall 34, and side wall 36 define a concave structure for lifting treats from the container.

As shown in FIG. 2, one edge of the ramp surface 30 secures to the front wall 18 on one side of the opening 24. Likewise, one edge of the side wall 36 secures to the front wall on an opposite side of the opening 24 from the ramp surface 30. Accordingly, treats 26 are free to roll out of the concave interior volume through the opening 24. In the illustrated embodiment, the opening 24 is larger than an opening 38 defined by the ramp surface 30, bottom surface 32, and side wall 36, i.e., the rectangular area defined by the edges of these structures projected on to the front wall 18. In this manner, jamming of the apparatus 10 as treats exit the projection 22 through the opening 24 is reduced. In the illustrated embodiment, the opening 24 has an arcuate perimeter extending between the ramp surface 30 and side wall 36. However, other shapes may also be used.

Note that the embodiment of FIG. 2 uses planer surfaces 30, 32, 34, 36 to define the concave interior volume of the projection 22. However, curved surfaces may also be used. In particular, the slope of the ramp surface 30 need not be constant provided that it provides a smooth path guiding treats to the opening 24 as outlined below. For example, the slope of the ramp surface 30 may be montonic but non-constant, such as a portion of a parabolic, circular, sinusoidal, elliptical, or other curved shape having a monotonic slope.

Pet treats, because of their irregular shape and structure, are particularly prone to bridging and interlocking, which make jamming a real possibility. In the disclosed embodiment, there are no internally protruding structures that move in relation to the sidewall 16 of the container 14. This reduces the risk of jamming. The tumbling action of the container 14 also helps to reduce jamming.

Figure 3:
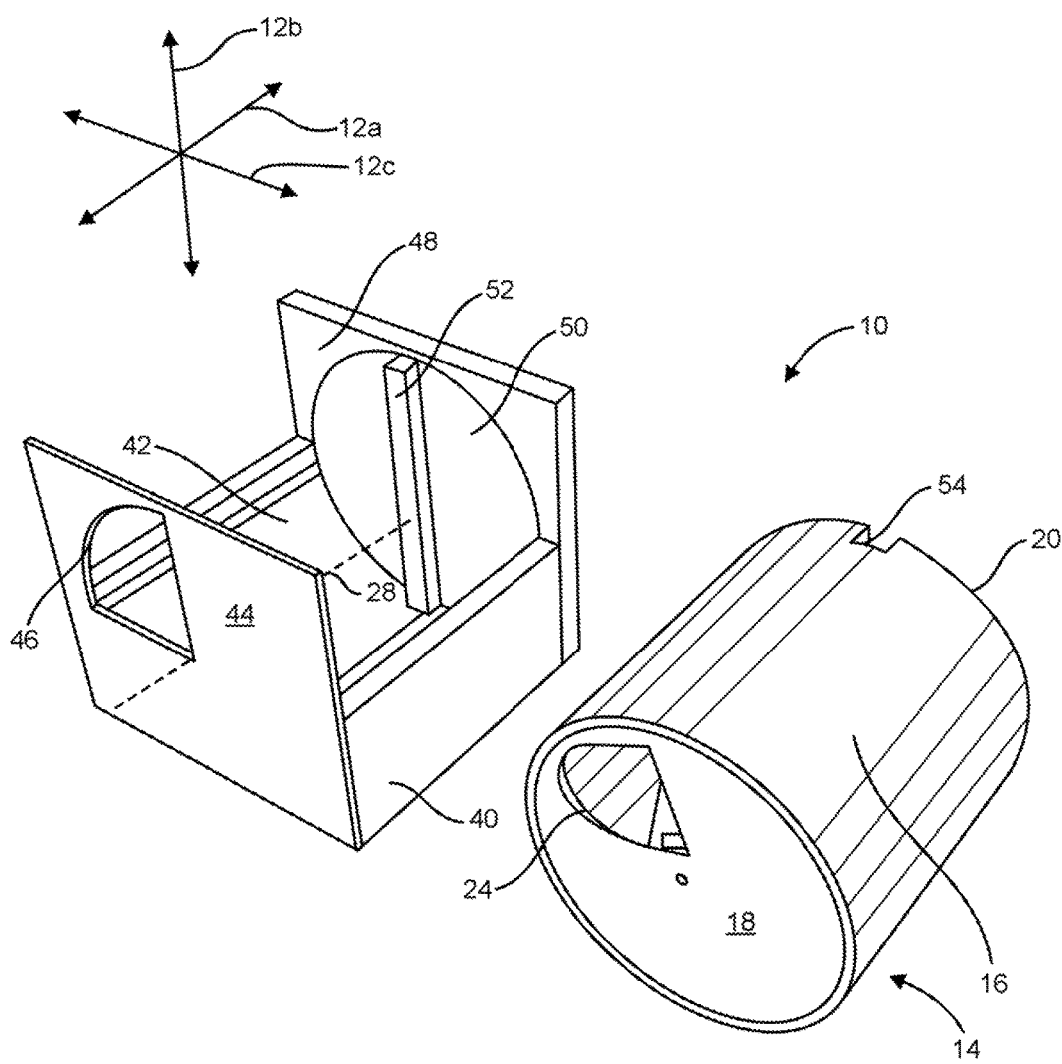
FIG. 3 is an isometric view of the container and a seat for supporting the container in accordance with an embodiment of the present invention.

Referring to FIG. 3, the apparatus 10 may further include a base 40 for supporting the container 14 on a planar support surface or for mounting to some other structure. The base 40 may include a seat 42 conforming to a cylinder, which may be a cylinder having an axis of symmetry parallel to the longitudinal direction 12a. The radius of the seat 42 may be greater than a radius of the outer surface of the sidewall 16 by an amount sufficient to allow the sidewall 16 to nest in the seat 42 while also being rotatable relative to the surface 42.

The base 40 may include a front wall 44 defining an opening 46 and a rear wall 48. The walls 44 and 46 are offset from one another along the longitudinal direction 12a and may be vertical parallel to the vertical and lateral directions 12b, 12c. In the illustrated embodiment, opening 46 is pie shape, e.g. a segment of a circle centered on the axis of symmetry of cylindrical surface 42. As is apparent, the opening 46 may be a 90-degree segment extending over an angular region spanning from the parallel to the vertical direction 12b to parallel to the lateral direction 12c. Other sizes and configurations of the opening 46 are possible. The illustrated embodiment advantageously provides a large area through which treats 26 may exit, thereby reducing jamming. In particular, the opening 46 may be larger than the opening 24 in the front wall 18.

The base 40 may include a rotatable member 50, which may be positioned adjacent the back wall 44 or rotate within an opening defined by the back wall 44. In some embodiments, only a rotatable member 50 is present and the back wall 44 is omitted.

In the illustrated embodiment, the rotator 50 includes a ridge 52 that engages a corresponding groove 54 in the back wall 20 of the container 14. In other embodiments, the ridge 52 may be formed on the back wall 20 of the container 14 and the groove 54 is defined by the rotator 50.

Figure 4A:
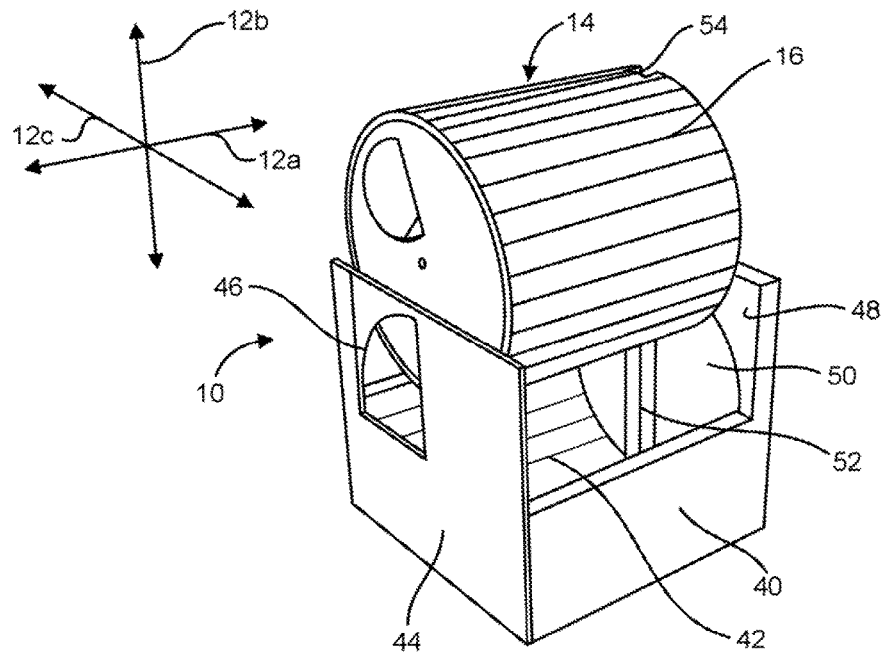
FIGS. 4A and 4B are isometric views illustrating the placement of the container in the seat in accordance with an embodiment of the present invention.
Figure 4B:
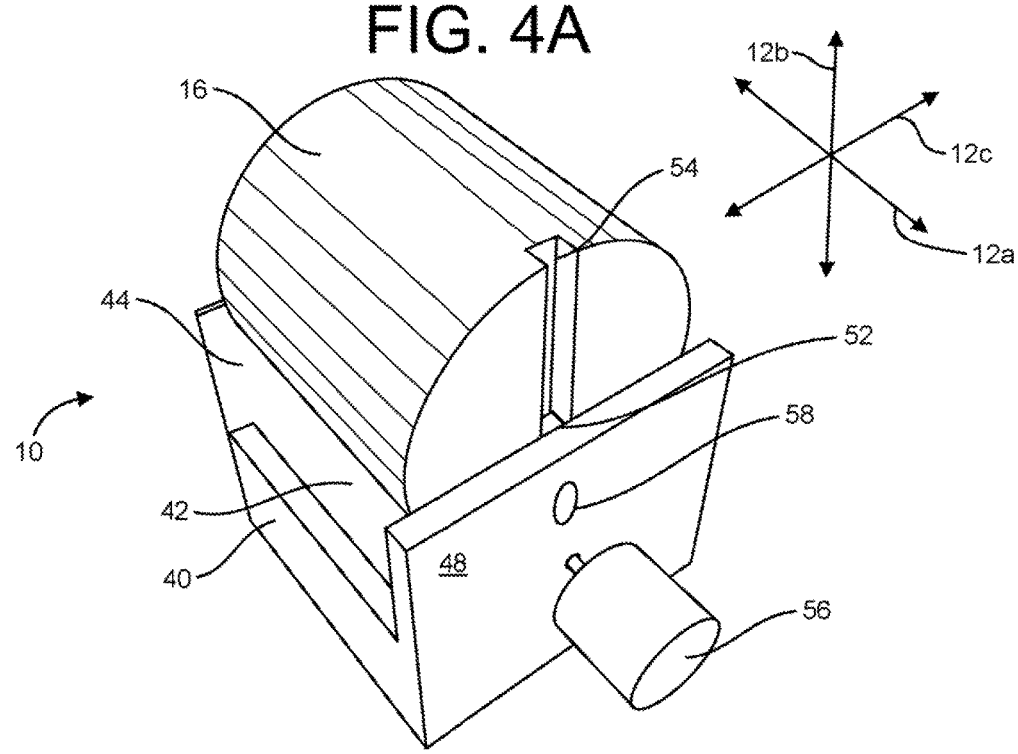

As shown in FIGS. 4A and 4B, to place the container 14 in the seat 42, the groove 54 is aligned with the ridge 52 while the ridge 52 is oriented generally vertically (e.g., within 15 degrees of parallel to vertical direction 12b) and slid over the ridge 52. In some embodiments, the rotator 50 may be rotatable such that once the groove 54 engages the ridge 52, the rotator 50 will rotate to permit seating within the seat 42 subject to a downward force by a user on the container 14.

FIG. 4B further illustrates a rotational actuator including a motor 56 that engages the rotator 50 either directly or through a belt drive or gear interface, such as one or more gears which may provide a speed reduction such that the rotator 50 rotates more slowly than the shaft of the motor 56.

Also apparent in FIG. 4B is a sensor 58 that senses positioning of the container 14 and projection 22. For example, sensor 58 may be a button that is triggered by a protuberance (not shown) on the back wall 20 of the container 14. The sensor 58 may be a magnetic sensor or an optical sensor that senses a reflective or colored marker on the back wall 20 of the container 14. In some embodiments, the motor 56 is an indexing motor such that its position can be precisely known and controlled. Accordingly, in such embodiments an additional sensor 58 may be omitted. In some embodiments, the apparatus 10 dispenses treats 26 continually such that a sensor 58 is also omitted.

Figure 5A:
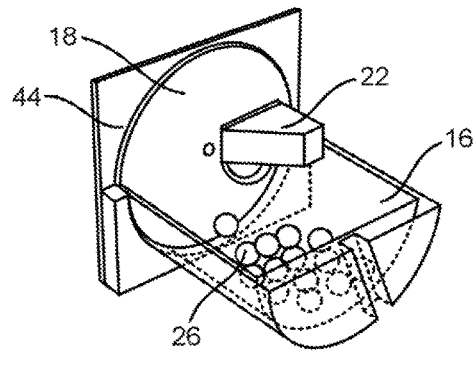
FIGS. 5A to 5E are isometric views illustrating the dispensing of treats using the treat dispenser in accordance with an embodiment of the present invention.
Figure 5B:
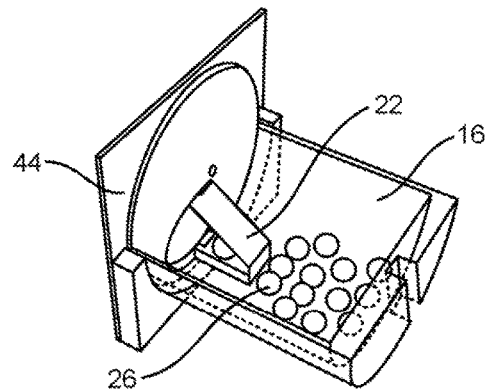
Figure 5C:
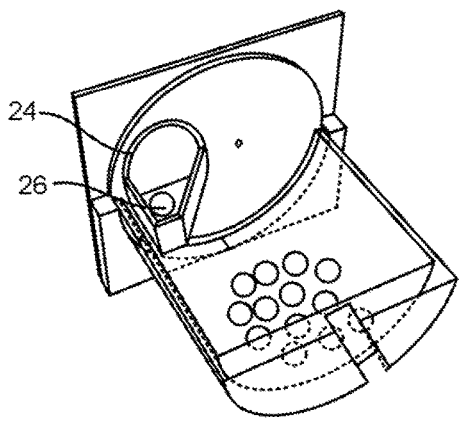
Figure 5D:
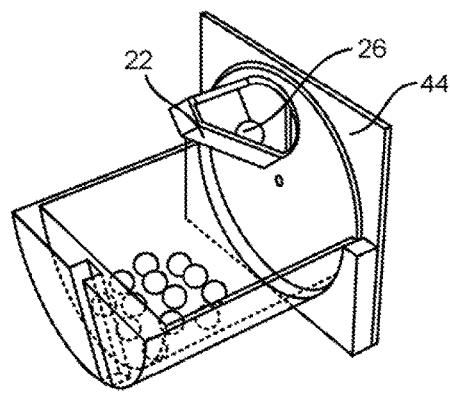
Figure 5E:
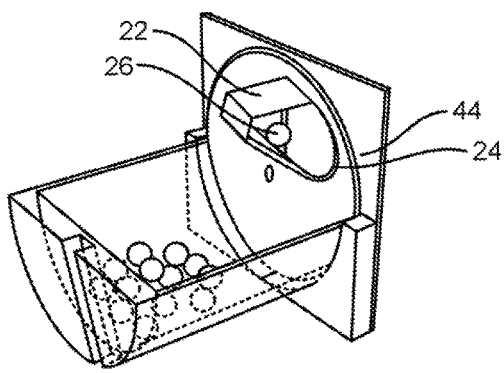

FIGS. 5A to 5E illustrate operation of the apparatus 10. As shown in FIGS. 5A and 5B, the projection 22 may be oriented above the treats 26 and be rotated down (clockwise in the illustrations) such that the projection 22 collects one or more treats. The projection 22 continues to rotate as shown in FIGS. 5C and 5D in the same direction until the opening 24 is aligned with the opening 46 as shown in FIG. 5E. The treat then slides down the ramp surface 30 and through the opening 46.

Figure 6A:
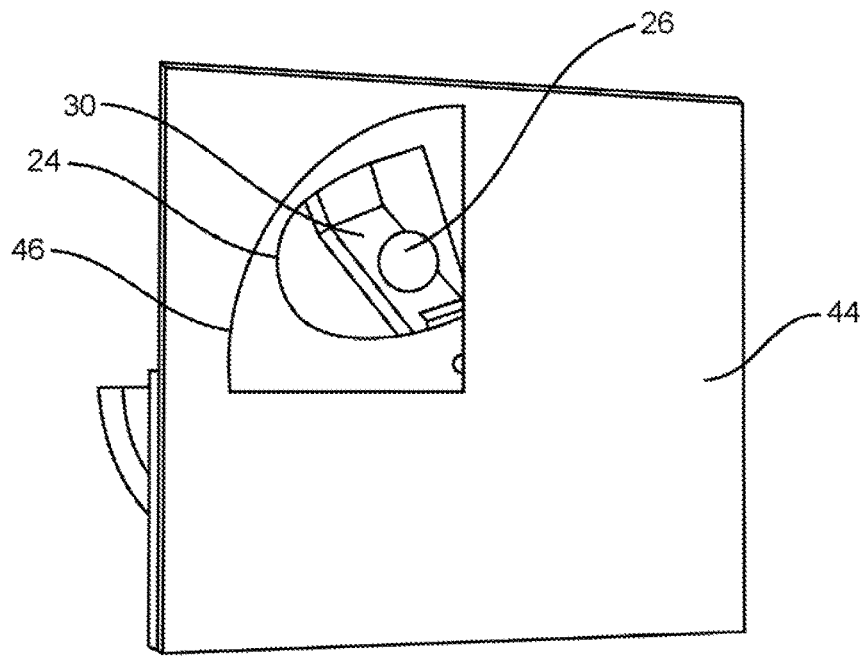
FIGS. 6A and 6B are isometric views illustrating the release of treats from the treat dispenser in accordance with an embodiment of the present invention.
Figure 6B:
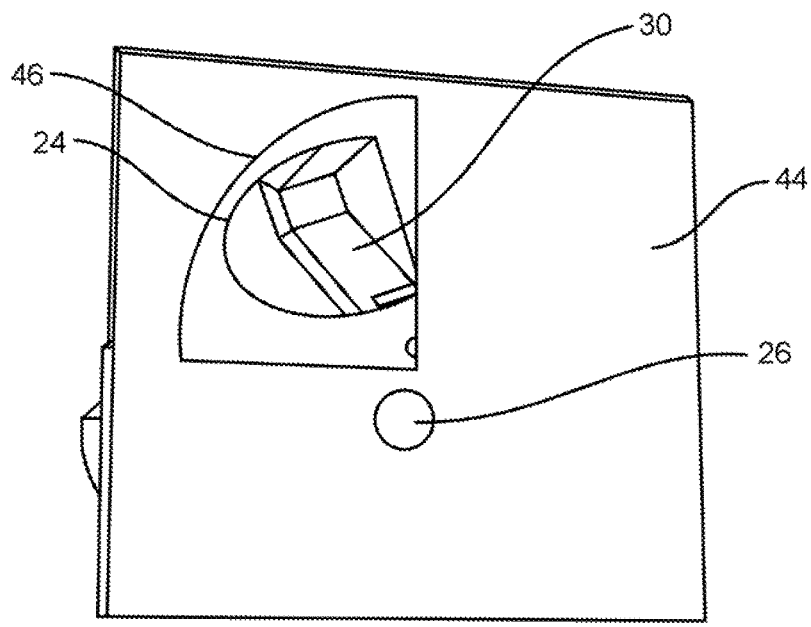

FIGS. 6A and 6B further illustrate operation of the ramp surface 30. When the opening 22 is aligned with the opening 46, the ramp surface 30 is oriented such that it slopes downwardly toward the front wall 18. Accordingly, treats 26 are urged by gravity down the ramp surface 30 through the openings 22, 46.

Figure 7:
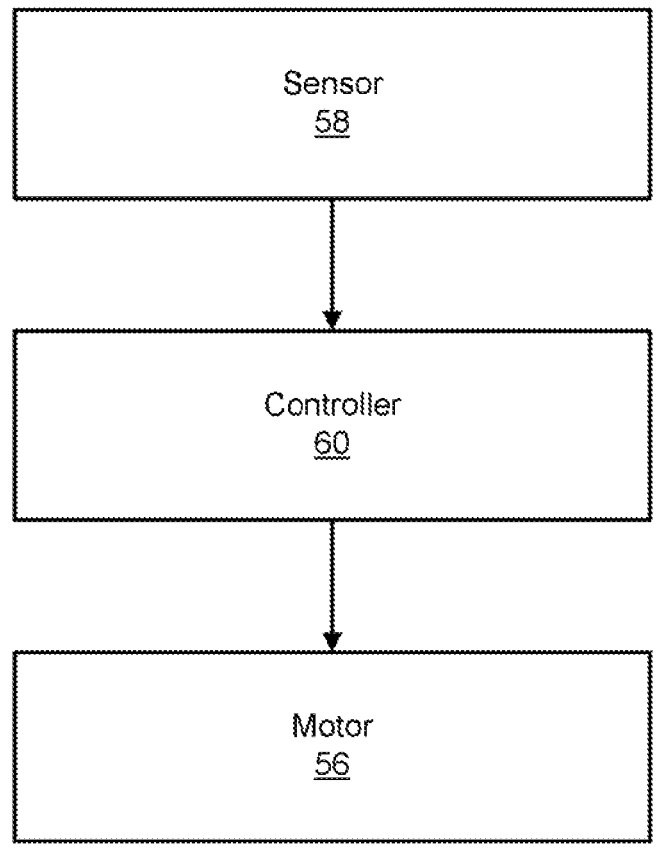
FIG. 7 is a schematic block diagram of components for controlling the treat dispenser in accordance with an embodiment of the present invention.

Referring to FIG. 7, a controller 60 may be coupled to the motor and sensor 58 as well as a power supply, such as an electric outlet or battery (not shown). The controller 60 may be a circuit programmed to control operation of the motor according to an output of the sensor 58. For example, the sensor 58 may produce an output when the projection 22 is at a predetermined position. The controller 60 may be programmed to (a) rotate the rotator 50 until that output is received, (b) wait for a predetermined delay, and then repeat from step (a). Accordingly, the rotator 50 will make one full rotation before stopping, ensuring that treats are only dispensed once between each delay period. In some embodiments, the controller 60 may be programmable such that a user may set the predetermined delay. In some embodiments, the sensor produced the output at some point after treats 26 are dispensed as shown in FIGS. 6A and 6B but prior to picking up of additional treats by the projection 22, such as a position at or between the positions of FIGS. 5E and 5A.

As is apparent in the above embodiments, only the projection 22 need rotate in order to pick up and release treats 26. Accordingly, the container 14 may be fixed and the projection 22 may be rotated alone. Likewise, various mounting and rotation mechanisms may be used for the container 14. For example, rather than resting in a cylindrical seat, mounting structures may engage the front and back walls 18, 20 like a spit and rotate the container 14.

In some embodiments, the longitudinal direction 12a is parallel to a horizontal plane, i.e. a plane that is perpendicular to the direction of gravity. In other embodiments, the longitudinal direction 12a is slightly tilted, e.g., between 1 and 10 degrees relative to the horizontal plane such that the projection 22 is at a lower end of the container 14. In this manner, gravity tends to urge treats 26 toward the projection 22 to facilitate lifting and dispensing thereof.

Pet treats have multiple shapes and sizes. In some embodiments, there may be provided interchangeable front walls 18 having differently sized and shaped projections 22 to accommodate different sizes and shapes. Alternatively, multiple different sizes and shapes of projections 22 may removably secure to the front wall 18. Certain projections 22, along with the tumbling action of the container 14, may be advantageous for dispensing a variety of treats with each rotation.

In some embodiments, the front wall 44 and opening 46 may be omitted. A retractable spring-loaded cover would occlude the outside of the opening 24 in the front wall 18. This cover would then be pulled open as the container 14 and cover 18 rotate to the position shown in FIG. 5D, and then released as the container 14 moves past the position shown in FIG. 5D, causing it to spring closed at the position shown in 5E.

In some embodiments, the controller 60 may be coupled to a wireless receiver and activated by an external device by means of an external signal, including WiFi, Bluetooth, LAN (Local Area Network), or other type of signal received from a device such as a computer, webcam, cellphone, smarthome, Amazon Echo, or a direct voice command. For example, the controller 60 may be instructed by wireless signal to execute one or more revolutions. The controller 60 may then execute these revolutions using outputs of the sensor 58 to sense when each revolution is completed. Although this invention has described a stand-alone design, it is also anticipated that it can be an integral component of another device, such as the Internet Canine Communication System (see, e.g., U.S. Pat. Nos. 9,226,477, 9,723,813 and 9,723,814).

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An apparatus comprising:
    a rotational actuator defining an axis of rotation;
    a container;
    a wall extending perpendicular to the axis and defining a wall aperture, the wall extending across a first end of the container; and
    a projection protruding into the container and rotatable by the rotational actuator, the projection configured to rotate between a first position to a second position with rotation by the rotational actuator, the projection configured to pick up one or more items from the container when moving from the first position to the second position and drop the one or more items through the wall aperture when in the second position, the projection being aligned with the wall aperture above the axis of rotation in the second position.

2. The apparatus of claim 1, further comprising:
    a sensor configured to sense a state of rotation of the projection;
    a wireless receiver;
    a controller coupled to the rotational actuator, the sensor, and the wireless receiver, the controller programmed to cause the rotational actuator to execute a revolution of the container as sensed by the sensor in response to an instruction received through the wireless receiver.

3. The apparatus of claim 1, wherein the wall is secured to the container, the projection being mounted to the wall.

4. The apparatus of claim 1, wherein the wall is removably securable to the container, the projection being fastened to the wall.

5. The apparatus of claim 1, wherein the projection defines a concave structure facing in a circumferential direction about the axis of rotation.

6. The apparatus of claim 5, wherein the concave structure includes a ramp surface that slopes outwardly from the axis of rotation with distance from the wall such that the one or more items slide down the ramp surface toward the axis of rotation when the projection is in the second position.

7. The apparatus of claim 1, further comprising a seat sized to rotatably receive the container, the rotational actuator being mounted to the seat.

8. The apparatus of claim 7, further comprising a seat face defining a seat aperture, the seat aperture positioned such that the wall aperture overlaps the seat aperture when the projection is in the second position, the projection being mounted to the wall.

9. The apparatus of claim 7, wherein the container is cylindrical.

10. The apparatus of claim 7, wherein the container includes a container bottom positioned opposite the wall, the rotational actuator engaging the container bottom.

11. The apparatus of claim 10, wherein the container bottom defines a groove and a rib is secured to the rotational actuator, the rib being positioned within the groove when the container is positioned within the seat.

12. An apparatus comprising:
    a container defining a first wall, a second wall opposite the first wall and a side wall positioned between the first and second walls, the first wall, second wall, and side wall defining an interior volume, the first wall defining a wall aperture;
    a rotational actuator engaging the container and configured to rotate the container about an axis of rotation perpendicular to the first wall; and
    a projection secured to the first wall protruding into the container the projection configured to pick up one or more items from the container upon rotation of the container from a first position to a second position and drop the one or more items through the wall aperture when in the second position, wherein there are no internally protruding structures that move in relation to the side wall and the projection is above the axis of rotation in the second position.

13. The apparatus of claim 12, further comprising:
a sensor configured to sense a state of rotation of the projection; and
a controller coupled to the sensor and the rotational actuator and programmed to repeatedly—
(a) invoke rotation of the container until the sensor indicates that the projection has at least reached the second position; and
(b) pause rotation of the container for a delay period after performing (a).

14. The apparatus of claim 12, further comprising:
a sensor configured to sense a state of rotation of the projection; and
a controller programmed to pause rotation of the container when the sensor indicates that the projection has once reached the second position.

15. The apparatus of claim 12, wherein
the projection includes a concave structure having a ramp surface that slopes outwardly from the axis of rotation with distance from the wall; and
the concave structure is positioned to one side of the axis of rotation such that the one or more items slide down the ramp surface toward the axis of rotation when the projection is in the second position.

16. The apparatus of claim 12, wherein the first wall is removably secured to the container.

17. The apparatus of claim 12, further comprising a seat defining one or more cylindrical faces, the sidewall having a cylindrical shape sized to rotatably rest on the cylindrical faces.

18. The apparatus of claim 17, further comprising a seat face defining a seat aperture, the seat aperture positioned above the axis of rotation such that the wall aperture overlaps the seat aperture when the projection is in the second position.

19. The apparatus of claim 17, wherein the second wall defines a groove and a rib is secured to the rotational actuator, the rib being positioned within the groove when the container is positioned within the seat.

20. An apparatus comprising:
a means for rotating about an axis of rotation;
a means for containing items;
a means for lifting the items positioned in the means for containing items and coupled to the means for rotating; and
a means for releasing the items out of the means for containing items from a position above the axis of rotation.

* * * * *